United States Patent
Kwak et al.

(10) Patent No.: US 9,529,224 B2
(45) Date of Patent: Dec. 27, 2016

(54) LIQUID CRYSTAL DISPLAY

(71) Applicant: Samsung Display Co., Ltd., Yongin, Gyeonggi-Do (KR)

(72) Inventors: Chang Hun Kwak, Suwon-si (KR); YiSeop Shim, Suwon-si (KR); Nuree Um, Icheon-si (KR); Chul Huh, Yongin-si (KR)

(73) Assignee: Samsung Display Co., LTD. (KR)

( * ) Notice: Subject to any disclaimer, the term of this patent is extended or adjusted under 35 U.S.C. 154(b) by 104 days.

(21) Appl. No.: 14/248,137

(22) Filed: Apr. 8, 2014

(65) Prior Publication Data
US 2015/0092138 A1   Apr. 2, 2015

(30) Foreign Application Priority Data
Oct. 1, 2013   (KR) .......................... 10-2013-0117469

(51) Int. Cl.
G02F 1/1333   (2006.01)
G02F 1/1339   (2006.01)
G02F 1/1335   (2006.01)
G02F 1/1343   (2006.01)

(52) U.S. Cl.
CPC ..... G02F 1/133512 (2013.01); G02F 1/13394 (2013.01); G02F 2001/13396 (2013.01); G02F 2001/13398 (2013.01); G02F 2001/134345 (2013.01)

(58) Field of Classification Search
CPC .............. G02F 1/1333; G02F 1/133512; G02F 1/13394; G02F 2001/13398; G02F 2001/13396; G02F 2001/134345
USPC ................................... 349/110–111, 155–157
See application file for complete search history.

(56) References Cited

U.S. PATENT DOCUMENTS

2012/0033165 A1*   2/2012   Lee .................... G02F 1/133512
349/110
2012/0038867 A1*   2/2012   Kwon ............... G02F 1/133512
349/110

FOREIGN PATENT DOCUMENTS

| KR | 10-2004-0013497 | 2/2004 |
| KR | 10-2007-0006485 | 1/2007 |
| KR | 10-2008-0042338 | 5/2008 |
| KR | 10-2008-0071749 | 8/2008 |
| KR | 10-2008-0082164 | 9/2008 |
| KR | 10-2013-0020281 | 2/2013 |

* cited by examiner

*Primary Examiner* — Charles Chang
(74) *Attorney, Agent, or Firm* — Innovation Counsel LLP

(57) ABSTRACT

A liquid crystal display includes a display substrate, an opposite substrate, a liquid crystal layer, a main spacer, and a sub-spacer. The display substrate includes a plurality of pixel areas and a light blocking area, and at least one thin film transistor is disposed in the light blocking area. The opposite substrate is coupled to the display substrate. The liquid crystal layer is disposed between the display substrate and the opposite substrate. The main spacer is disposed on the display substrate, includes a light blocking material, and makes contact with the opposite substrate to maintain a cell gap between the display substrate and the opposite substrate. The sub-spacer is disposed on the display substrate, includes the light blocking material, and is spaced apart from the opposite substrate. The sub-spacer has a size corresponding to the light blocking area, and the main spacer is protruded from the sub-spacer.

28 Claims, 13 Drawing Sheets

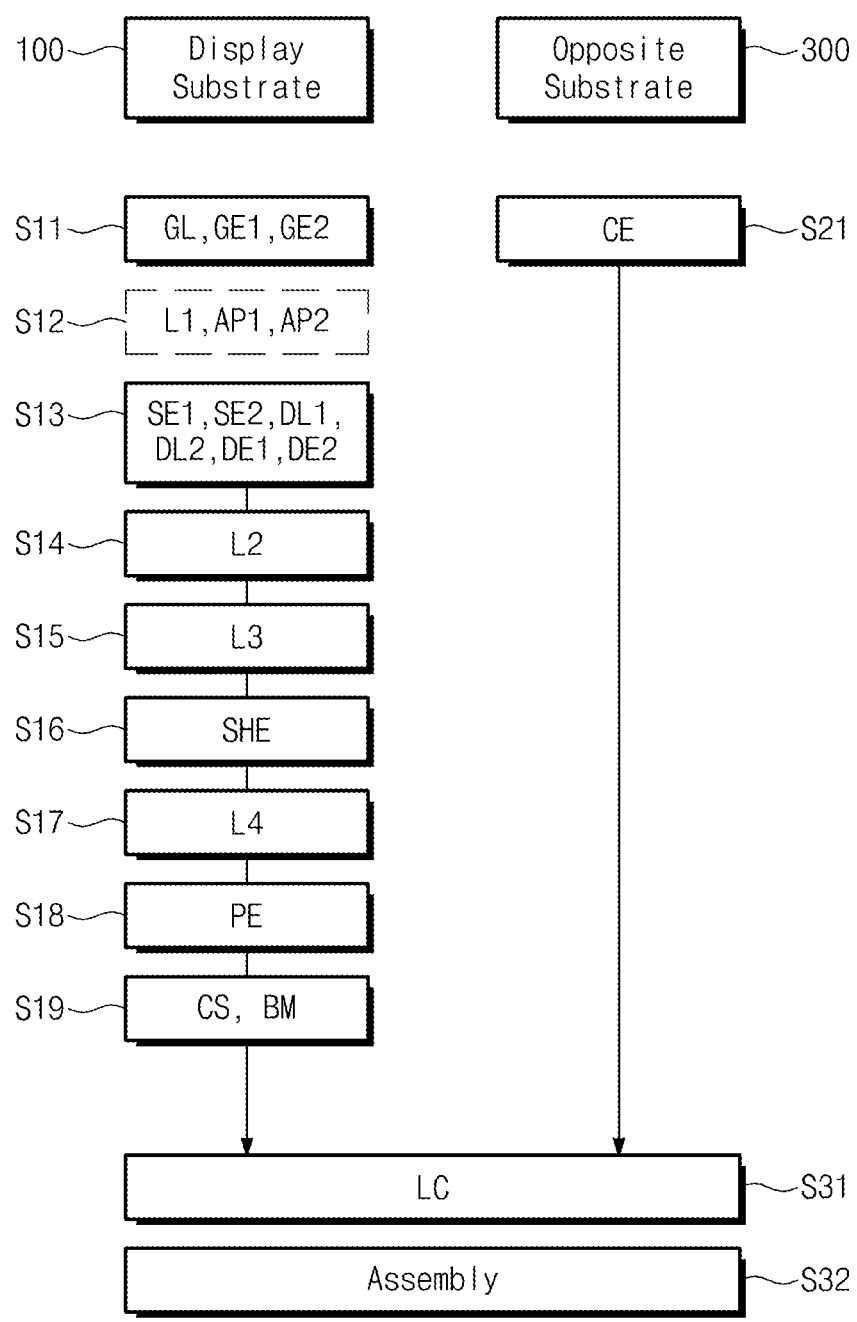

LIQUID CRYSTAL DISPLAY

CROSS-REFERENCE TO RELATED APPLICATION

This U.S. non-provisional patent application claims priority under 35 U.S.C. §119 of Korean Patent Application No. 10-2013-0117469, filed on Oct. 1, 2013, the contents of which are hereby incorporated by reference in its entirety.

BACKGROUND

1. Field of Disclosure

Embodiments of the present disclosure relate to a flat panel display device. More particularly, the present disclosure relates to a liquid crystal display.

2. Description of the Related Art

A liquid crystal display includes two transparent substrates and a liquid crystal layer disposed between the two transparent substrates. The liquid crystal display drives liquid crystal molecules of the liquid crystal layer to control a light transmittance in each pixel, thereby displaying an image.

In a vertical alignment mode liquid crystal display among various operation modes of the liquid crystal display, the liquid crystal molecules of the liquid crystal layer are vertically aligned with respect to the two substrates when no electric field is generated between the two substrates. The vertically aligned liquid crystal molecules do not transmit light, thereby display black image. When electric field is generated between the two substrates, the liquid crystal molecules shift to a tilted position allowing light to pass through and create a gray-scale display depending on the amount of tilt generated by the electric field. The vertical alignment mode liquid crystal display includes liquid crystal domains to align the liquid crystal molecules in different directions, and thus a viewing angle of the liquid crystal display is improved.

In recent years, a curved liquid crystal display has been developed. The curved liquid crystal display provides a user with a curved display panel, and thus provides the image having improved three-dimensional effect, a sense of immersion, and a sense of reality and presence to the user.

SUMMARY

Embodiments of the present disclosure provide a liquid crystal display capable of preventing a light leakage and simplifying a manufacturing process thereof.

Embodiments of the inventive concept provide a liquid crystal display including a display substrate that includes a plurality of pixels, each of the plurality of pixels including a pixel area and a light blocking area, the light blocking area including at least one thin film transistor, an opposite substrate that faces the display substrate while being coupled to the display substrate, a liquid crystal layer disposed between the display substrate and the opposite substrate, and a spacer disposed on the light blocking area. The spacer includes a main spacer including a light blocking material and making contact with the opposite substrate to maintain a cell gap between the display substrate and the opposite substrate, and a sub-spacer including the light blocking material, and spaced apart from the opposite substrate by a predetermined distance.

A difference in height between the main spacer and the sub-spacer may be from about 0.25 micrometers to about 0.8 micrometers.

T difference in height between the main spacer and the sub-spacer may be from about 0.5 micrometers to about 0.8 micrometers.

An area ratio of a main spacer area to a display area in which an image is displayed may be about 1% or less.

The main spacer may be disposed at a position corresponding to an area in which the thin film transistor is disposed.

The main spacer may be provided at one per every three or nine pixels.

The display substrate may comprise red, green, and blue color pixels, and the main spacer maybe disposed on the blue color pixel.

The pixel area may comprise a first sub-pixel area having a first sub-pixel electrode and a second sub-pixel area having a second sub-pixel electrode, and the thin film transistor may comprise a first thin film transistor connected to the first sub-pixel electrode and a second thin film transistor connected to the second sub-pixel electrode.

The display substrate may further include a first data line electrically connected to the first sub-pixel electrode to apply a first data signal to the first sub-pixel electrode, a second data line electrically connected to the second sub-pixel electrode to apply a second data signal different from the first data signal to the second sub-pixel electrode, and a shielding electrode extending along the first and second data lines to receive a black gray scale voltage.

The light blocking area may be disposed between the first and second sub-pixel areas, the sub-spacer may have a rectangular shape, an oval shape, or a lozenge shape when viewed in a plan view, and the main spacer may have a circular shape, a rectangular shape, or an oval shape when viewed in a plan view.

The sub-spacer has a size corresponding to the light blocking area and the main spacer is protruded from the sub-spacer.

Embodiments of the inventive concept provide a liquid crystal display including a display substrate that includes a plurality of pixels, each of the plurality of pixels including a pixel area and a light blocking area, the light blocking area including at least one thin film transistor, an opposite substrate that faces the display substrate while being coupled to the display substrate, a liquid crystal layer disposed between the display substrate and the opposite substrate, a spacer disposed on the display substrate, including a light blocking material, and making contact with the opposite substrate to maintain a cell gap between the display substrate and the opposite substrate, and a light blocking layer disposed on the display substrate, including the light blocking material, and spaced apart from the opposite substrate by a predetermined distance. A difference in height between the light blocking layer and the spacer is about 0.25 micrometers to about 0.8 micrometers.

Embodiments of the inventive concept provide a liquid crystal display including a display substrate that includes a display substrate that includes a plurality of pixels, each of the plurality of pixels including a pixel area and a light blocking area, the light blocking area including at least one thin film transistor, an opposite substrate that faces the display substrate while being coupled to the display substrate, a liquid crystal layer that is disposed between the display substrate and the opposite substrate, and a spacer disposed on the light blocking area. The spacer may include a main spacer that includes a light blocking material and makes contact with the opposite substrate to maintain a cell gap between the display substrate and the opposite substrate and a sub-spacer that includes the light blocking material, and is spaced apart from the opposite substrate by a predetermined distance. The sub-spacer may have a size corresponding to the light blocking area and the main spacer is protruded from the sub-spacer. The spacer may have substantially the same thickness except a portion of the main spacer.

A thickness ratio of the sub-spacer to the main spacer may be from about 70% to about 95%.

The spacer may be formed on the display substrate over the thin film transistor and cross sectional area of the main spacer may decrease as distance from the thin film transistor increases.

According to the above, since the sub-spacer has the size corresponding to the light blocking area, a smear characteristic may be improved.

In addition, the main spacer and the sub-spacer are disposed on the display substrate. Therefore, a cell gap in the liquid crystal display having the curved shape may be prevented from varying due to the mis-alignment between the display substrate and the opposite substrate, and thus the display quality of the liquid crystal display may be improved.

Further, since the main spacer and the sub-spacer include the light blocking material to perform a light blocking function, a manufacturing process of the liquid crystal display may be simplified and a light leakage phenomenon may be prevented from occurring.

BRIEF DESCRIPTION OF THE DRAWINGS

The above and other advantages of the present disclosure will become readily apparent with reference to the following detailed description when considered in conjunction with the accompanying drawings wherein:

FIG. 11 is a flowchart showing a manufacturing process of a liquid crystal display according to an exemplary embodiment of the present disclosure.

DETAILED DESCRIPTION

Figure 1:
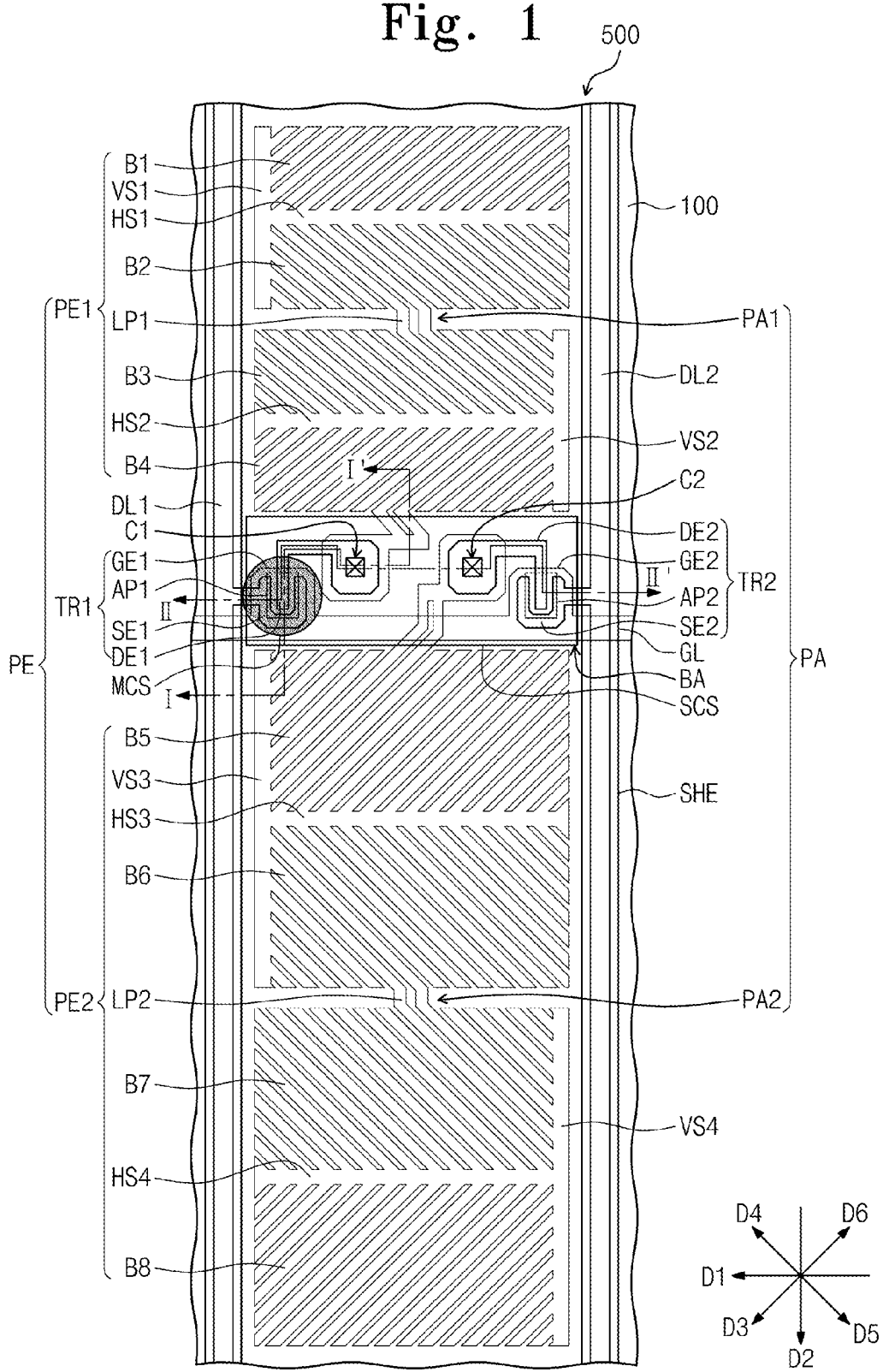
FIG. 1 is a plan view showing a liquid crystal display according to an exemplary embodiment of the present disclosure.

It will be understood that when an element or layer is referred to as being "on", "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2A:
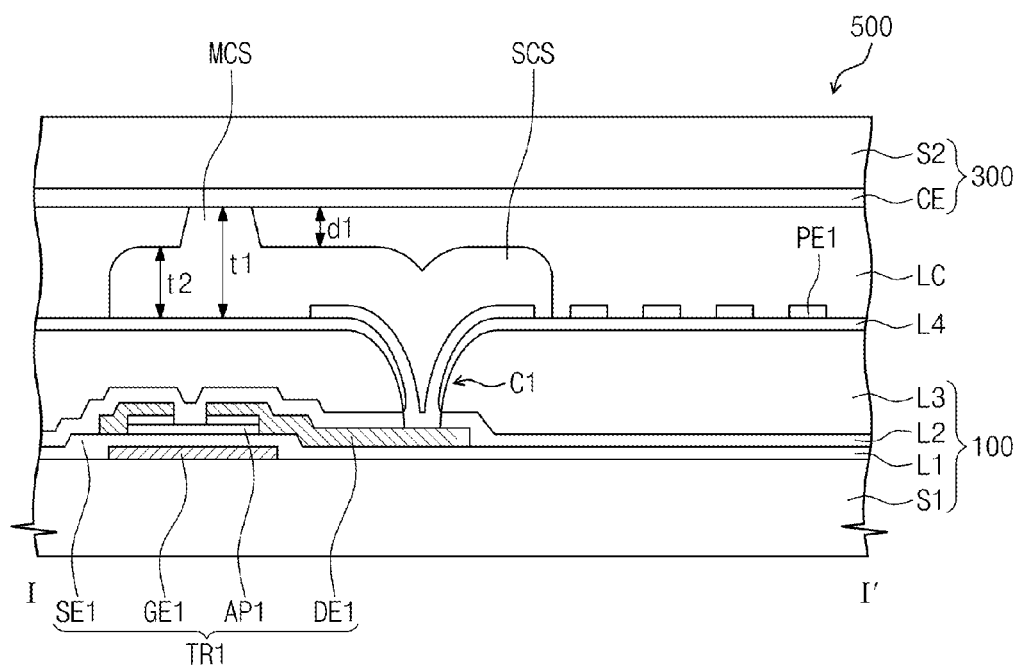
FIG. 2A is a cross-sectional view taken along a line I-I' of FIG. 1.
Figure 2B:
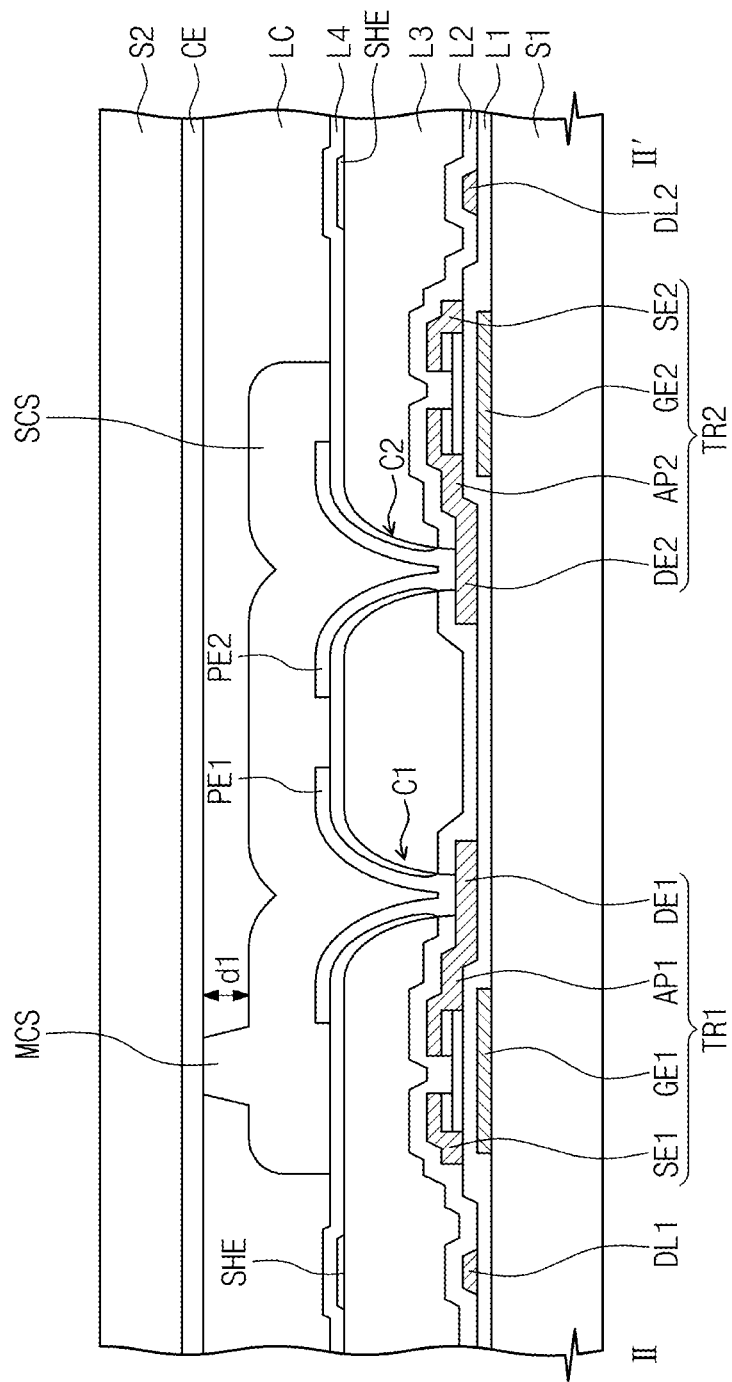
FIG. 2B is a cross-sectional view taken along a line II-II' of FIG. 1.

FIG. 1 is a plan view showing a liquid crystal display according to an exemplary embodiment of the present disclosure, FIG. 2A is a cross-sectional view taken along a line I-I' of FIG. 1, and FIG. 2B is a cross-sectional view taken along a line II-II' of FIG. 1.

The liquid crystal display 500 includes a plurality of pixels, but only one pixel area PA in which one pixel is disposed has been shown in FIG. 1. In addition, FIG. 1 shows a structure of the liquid crystal display 500 in plan view and FIGS. 2A and 2B show a cross-sectional structure of the liquid crystal display 500.

Referring to FIGS. 1, 2A, and 2B, the liquid crystal display 500 includes a display substrate 100, an opposite substrate 300, and a liquid crystal layer LC. The opposite substrate 300 faces the display substrate 100 while being coupled to the display substrate 100, and the liquid crystal layer LC is interposed between the display substrate 100 and the opposite substrate 300.

The liquid crystal display 500 may further include other components besides the display substrate 100 and the opposite substrate 300. For instance, the liquid crystal display 500 may further include a backlight assembly (not shown) that provides light to the display substrate 100 and the opposite substrate 300, but the structure of the liquid crystal display 500 should not be limited to the above-mentioned structure including the backlight assembly.

The display substrate 100 includes a first base substrate S1, a gate line GL, a first data line DL1, a second data line DL2, a first thin film transistor TR1, a second thin film transistor TR2, a shielding electrode SHE, a pixel electrode PE and a spacer including a main spacer MCS and a sub-spacer SCS.

The first base substrate S1 may be an insulating substrate having light transmitting property. The first base substrate S1 may be a flexible substrate, e.g., a plastic substrate. The gate line GL is disposed on the first base substrate S1 and electrically connected to the first and second thin film transistors TR1 and TR2 to transmit a gate signal to the first and second thin film transistors TR1 and TR2.

In the present exemplary embodiment, when the area in which the pixel electrode PE is disposed is referred to as the pixel area PA, the pixel area PA includes a first sub-pixel area PA1 and a second sub-pixel area PA2. In this case, the pixel electrode PE includes a first sub-pixel electrode PE1 disposed in the first sub-pixel area PA1 and a second sub-pixel electrode PE2 disposed in the second sub-pixel area PA2.

The first and second data lines DL1 and DL2 are disposed on the first base substrate S1 and insulated from the gate line GL. The first data line DL1 applies a first data signal to the first thin film transistor TR1 and the second data line DL2 applies a second data signal to the second thin film transistor TR2. The first data line DL1 extends along one side of the first and second sub-pixel electrodes PE1 and PE2 and the second data line DL2 extends along the other side of the first and second sub-pixel electrodes PE1 and PE2. Accordingly, the first and second sub-pixel electrodes PE1 and PE2 may be disposed between the first and second data lines DL1 and DL2.

The first thin film transistor TR1 is electrically connected to the gate line GL, the first data line DL1, and the first sub-pixel PE1. Therefore, when the first thin film transistor TR1 is turned on in response to the gate signal, the first data signal is applied to the first sub-pixel electrode PE1.

In detail, the first thin film transistor TR1 includes a first gate electrode GE1, a first active pattern AP1, a first source electrode SE1, and a first drain electrode DE1. The first gate electrode GE1 is branched from the gate line GL, and the first active pattern AP1 is disposed on the first gate electrode GE1 while a first insulating layer L1 is disposed between the first active pattern AP1 and the first gate electrode GE1. The first source electrode SE1 is branched from the first data line DL1 to make contact with the first active pattern AP1 and the first drain electrode DE1 is spaced apart from the first source electrode SE1 to make contact with the first active pattern AP1.

The second thin film transistor TR2 is electrically connected to the gate line GL, the second data line DL2, and the second sub-pixel electrode PE2. When the second thin film transistor TR2 is turned on by the gate signal, the second data signal is applied to the second sub-pixel electrode PE2.

In detail, the second thin film transistor TR2 includes a second gate electrode GE2, a second active pattern AP2, a second source electrode SE2, and a second drain electrode DE2. The second gate electrode GE2 is branched from the gate line GL, and the second active pattern AP2 is disposed on the second gate electrode GE2 while the first insulating layer L1 is disposed between the second active pattern AP2 and the second gate electrode GE2. The second source electrode SE2 is branched from the second data line DL2 to make contact with the second active pattern AP2 and the second drain electrode DE2 is spaced apart from the second source electrode SE2 to make contact with the second active pattern AP2.

Each of the first and second active patterns AP1 and AP2 may include a semiconductor material, such as amorphous silicon, crystalline silicon, etc., but it should not be limited thereto or thereby. According to another embodiment, each of the first and second active patterns AP1 and AP2 may include an oxide semiconductor, e.g., IGZO, ZnO, $SnO_2$, $In_2O_3$, $Zn_2SnO_4$, $Ge_2O_3$, and $HfO_2$, or a compound semiconductor, e.g., GaAs, GaP, and InP.

A second insulating layer L2 covers the first and second thin film transistors TR1 and TR2 and a third insulating layer L3 is disposed on the second insulating layer L2. The second insulating layer L2 includes an inorganic insulating material and the third insulating layer L3 includes an organic insulating material. As an example, the third insulating layer L3 may be a color filter layer including red, green, and blue color filters.

Shielding electrodes SHE is formed along each of the first and second data lines DL1 and DL2. The shielding electrodes SHE has a width greater than that of the first and second data lines DL1 and DL2 and is disposed to cover the first and second data lines DL1 and DL2 when viewed in a plan view. The shielding electrodes SHE may completely cover the first and second data lines DL1 and DL2 when viewed in a plan view.

As shown in FIG. 2B, the shielding electrode SHE is disposed on the third insulating layer L3. The shielding electrode SHE receives a voltage corresponding to a black gray scale.

The shielding electrode SHE is covered by a fourth insulating layer L4, and the first and second sub-pixel electrodes PE1 and PE2 are disposed on the fourth insulating layer L4. The first and second sub-pixel electrodes PE1 and PE2 may include a transparent conductive oxide. The shielding electrode SHE is electrically insulated from the first and second sub-pixel electrodes PE1 and PE2 by the fourth insulating layer L4. As an example, the shielding electrode SHE may include the transparent conductive oxide as the first and second sub-pixel electrodes PE1 and PE2. If the shielding electrode SHE includes the transparent conductive oxide, the shielding electrode SHE may be formed of the same material as the pixel electrodes PE1 and PE2 on the same plane without intervening the fourth insulating layer L4 between the shielding electrode SHE and the pixel electrodes PE1 and PE2. The first sub-pixel electrode PE1 makes contact with the first drain electrode DE1 via a first contact hole C1 formed through the second, third, and fourth insulating layers L2, L3, and L4. The second sub-pixel electrode PE2 makes contact with the second drain electrode DE2 via a second contact hole C2 formed through the second, third, and fourth insulating layers L2, L3, and L4.

As described above, the first and second sub-pixel electrodes PE1 and PE2 are driven by different data signals, so that the first and second sub-pixel areas PA1 and PA2 display different gray scales.

Although not shown in figures, a first alignment layer may be disposed above the first and second sub-pixel electrodes PE1 and PE2. When no electric field is formed between the display substrate 100 and the opposite substrate 300, the first alignment layer aligns liquid crystal molecules of the liquid crystal layer LC such that the liquid crystal molecules are inclined with respect to the first alignment layer. In this case, the liquid crystal molecules inclined by the first alignment layer is more inclined by the electric field, and thus the liquid crystal molecules are aligned in a direction substantially in parallel to the display substrate 100. The above-mentioned operation of the liquid crystal molecules due to the electric field is called a super vertical alignment (SVA) mode. Accordingly, a response speed required to display the image in the liquid crystal display 500 may be improved.

A light blocking area BA is an area defined by adjacent shielding electrode SHE, the first sub-pixel area and the second sub-pixel areas PA1 and PA2. However, if the shielding electrode SHE is omitted, the light blocking area BA may be an area defined by the first data line DL1, the second data line DL2, between the first subpixel area and the second sub-pixel areas PA1 and PA2. The first and second thin film transistors TR1 and TR2 and the first and second contact holes C1 and C2 are disposed in the light blocking area BA.

The spacer including the main spacer MCS and the sub-spacer SCS is formed of an organic material including a light blocking material, e.g., a carbon black, and disposed in the light blocking area BA of the display substrate 100. In particular, the main spacer MCS and the sub-spacer SCS may be disposed on the fourth insulating layer L4, or disposed on the first alignment layer in the case that the first alignment layer is disposed on the fourth insulating layer L4 and the pixel electrode PE.

As an example, the sub-spacer SCS has a size corresponding to that of the light blocking area BA and the main spacer MCS is protruded from the sub-spacer SCS toward the opposite substrate 300.

Since the main spacer MCS and the sub-spacer SCS have a light blocking property caused by the light blocking material, the main spacer MCS and the sub-spacer SCS may block the light. Particularly, when the liquid crystal display 500 includes the backlight assembly disposed at a rear of the display substrate 100, the main spacer MCS and the sub-spacer SCS may block the light provided from the backlight assembly.

As shown in FIGS. 2A and 2B, the main spacer MCS makes contact with the opposite substrate 300 to maintain a cell gap between the display substrate 100 and the opposite substrate 300 while no external force is applied to the liquid crystal display 500. The sub-spacer SCS is disposed to be spaced apart from the opposite substrate 300, and thus the sub-spacer SCS does not make contact with the opposite substrate 300 if no external force is applied to the liquid crystal display 500. In the present exemplary embodiment, a difference in height between the main spacer MCS and the sub-spacer SCS is about 0.25 micrometers to about 0.8 micrometers. For instance, when the main spacer MCS has a thickness t1 of about 3 micrometers, the sub-spacer SCS has a thickness t2 of about 2.5 micrometers. The thickness ratio of the sub-spacer SCS to the main spacer MCS may be from about 70% to about 95%.

The main spacer MCS and the sub-spacer SCS include a material having elasticity. Therefore, when the external force is applied to the liquid crystal display 500, the height of the main spacer MCS is reduced and a reference cell gap between the display substrate 100 and the opposite substrate 300 is temporarily reduced. Then, when the external force disappears, the display substrate 100 and the opposite substrate 300 may maintain the reference cell gap by a restoring force of the main spacer MCS.

However, in a case that the external force applied to the liquid crystal display 500 is greater than the elastic force of the main spacer MCS, the distance between the display substrate 100 and the opposite substrate 300 may not be restored to the reference cell gap. As a result, the cell gap of the liquid crystal display 500 is not uniformly maintained at the reference cell gap. The sub-spacer SCS serves as a buffer against the external force applied to the main spacer MCS, and thus the elasticity of the main spacer MCS may be prevented from being lowered by the external force.

As shown in FIGS. 2A and 2B, due to the main spacer MCS and the sub-spacer SCS, a sufficient space may be secured between the display substrate 100 and the opposite substrate 300 to accommodate the liquid crystal layer LC.

As an example, the main spacer MCS is disposed in the light blocking area BA to correspond to the first thin film transistor TR1 or the second thin film transistor TR2. Since the number of layers stacked in the areas in which the first and second thin film transistors TR1 and TR2 are formed is much more than that of the other areas, the areas may be protruded to the opposite substrate 300. Therefore, when the main spacer MCS having a relatively thick thickness is formed on the area in which the first thin film transistor TR1 or the second thin film transistor TR2 is formed, a manufacturing process time required to form the main spacer MCS at a desired thickness may be shortened.

Referring to FIGS. 2A and 2B, the opposite substrate 300 includes a second base substrate S2 and a common electrode CE. The second base substrate S2 may be an insulating substrate having a light transmitting property. The second base substrate S2 may have a flexible property.

The common electrode CE forms the electric field applied to the liquid crystal layer LC in cooperation with the pixel electrode PE. The liquid crystal molecules of the liquid crystal layer LC are aligned in accordance with the electric field formed between the pixel electrode PE and the common electrode CE. The common electrode CE receives a common voltage and the first and second sub-pixel electrodes PE1 and PE2 respectively receive the first and second data voltages from the first and second data lines DL1 and DL2. Thus, the electric field is formed to have intensity corresponding to an electric potential difference between the common voltage and the first and second data voltages and the alignment of the liquid crystal molecules of the liquid crystal layer LC is changed in accordance with the intensity of the electric field, thereby controlling a light transmittance of the liquid crystal layer LC.

The light provided to the liquid crystal layer LC may be the light provided from the backlight assembly (not shown) disposed at the rear of the display substrate 100.

The shielding electrode SHE is applied with the voltage corresponding to the black gray scale. For instance, the voltage having the same electric potential as that of the common voltage applied to the common electrode CE may be applied to the shielding electrode SHE. Thus, the electric field is not formed between the shielding electrode SHE and the common electrode CE. In particular, in the case that the liquid crystal molecules of the liquid crystal layer LC are negative type liquid crystal molecules, the liquid crystal molecules are vertically aligned against the surface of the shielding electrode SHE during a non-electric field state.

As described above, when the liquid crystal molecules are vertically aligned, the light provided from the backlight assembly may be blocked by the liquid crystal molecules aligned vertically. Accordingly, the area in which the shielding electrode SHE is formed may block the light provided from the backlight assembly.

When the sub-spacer SCS is formed to have a size corresponding to the light blocking area BA, a smear characteristic may be improved. The smear characteristic indicates a margin of the restoring force for the cell gap when the external force is applied to the liquid crystal display 500. Therefore, when the size of the sub-spacer SCS is increased, the margin is increased and the smear characteristic is improved.

Figure 3:
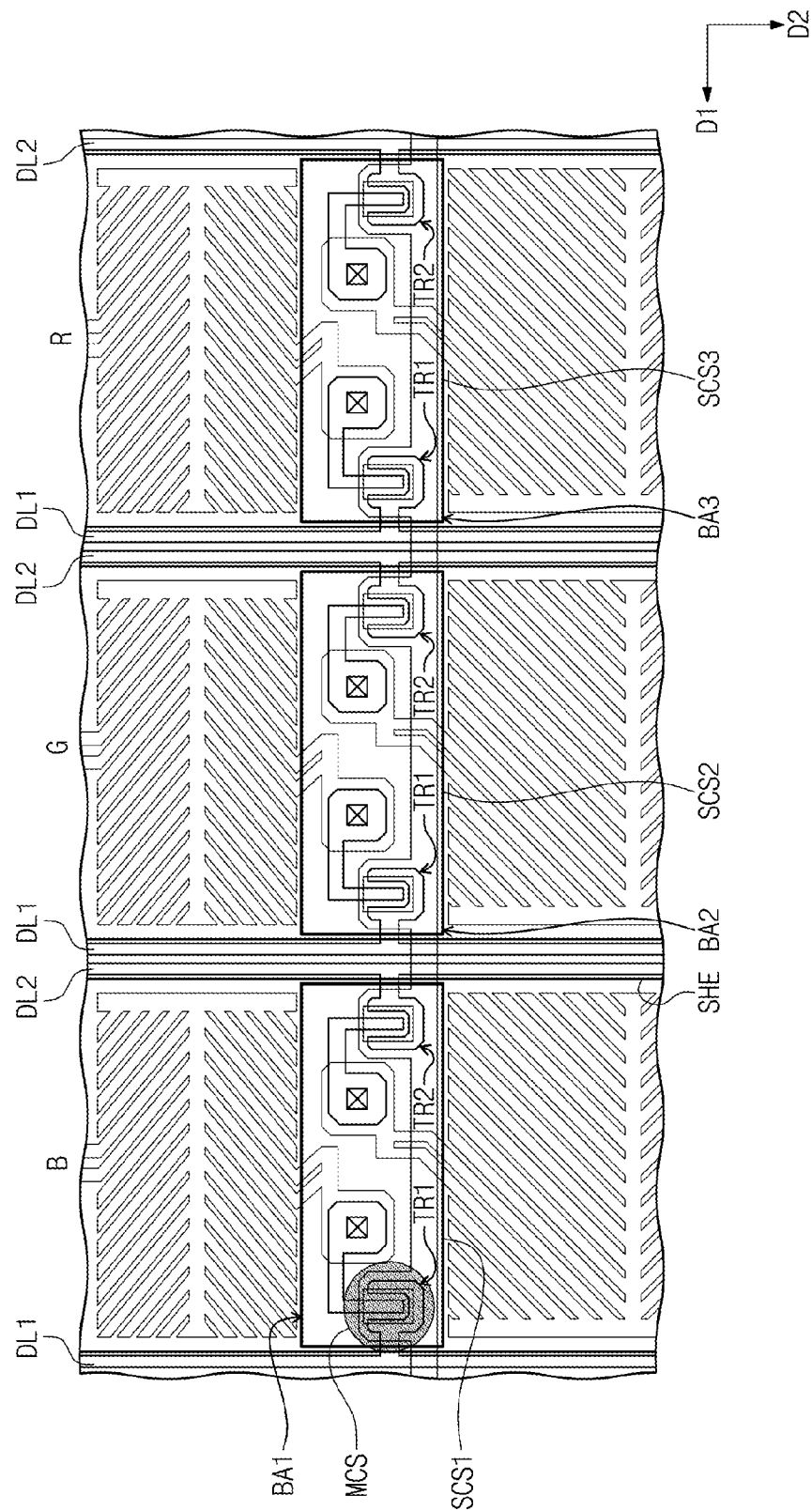
FIG. 3 is a plan view showing a position relation between a color pixel, a main spacer, and a sub-spacer according to another exemplary embodiment of the present disclosure.

The spacer has substantially the same thickness except a portion of the main spacer MCS. The main spacer MCS and the sub-spacer are formed of a same material and are formed in one piece. The main spacer MCS and the sub-spacer SCS may be formed through a same process, for example, the same exposure step and the same development step. The main spacer MCS may be connected to the sub-spacer SCS at the bottom of the main spacer MCS. Cross sectional area of the main spacer MCS decreases as distance from the sub-spacer SCS increases. FIG. 3 is a plan view showing a position relation between a color pixel, a main spacer, and a sub-spacer according to another exemplary embodiment of the present disclosure. FIG. 3 shows the pixels arranged in one row by three columns. The first and second thin film transistors TR1 and TR2 are disposed in each of the light blocking areas BA1, BA2, and BA3. The first, second, and third light blocking areas BA1, BA2, and BA3 respectively correspond to the pixels arranged in one row by three columns.

Referring to FIG. 3, blue, green, and red color pixels B, G, and R are sequentially arranged in the pixels arranged in one row by three columns along the row direction. Although not shown in figures, the color pixels having the same color are arranged in the same column.

In addition, the first and second thin film transistors TR1 and TR2 are arranged in each of the first, second, and third light blocking areas BA1, BA2, and BA3. However, the number of the thin film transistors arranged in each of the first, second, and third light blocking areas BA1, BA2, and BA3 may be changed by the application method of the data signals having different levels to the first and second sub-pixel electrodes PE1 and PE2 (shown in FIG. 1). That is, one or three or more thin film transistors may be arranged in each of the first, second, and third light blocking areas BA1, BA2, and BA3.

The main spacer MCS and the sub-spacer SCS is disposed in the first light blocking area BA1 in which the blue color pixel B is arranged, and the main spacer MCS is not disposed in the second and third light blocking areas BA2 and BA3.

The blue color pixel B may have a thickness thicker than the green and red color pixels G and R. In this case, a difference in thickness between the blue color pixel B and the other pixels such as green and red color pixels G and R is about 0.2 micrometers.

When the main spacer MCS is formed on the blue color pixel B. Particularly, when the main spacer MCS is formed on the blue color pixel B, a process time required to form the main spacer MCS on the display substrate 100 may be shortened and the process of forming the main spacer MCS may be easily performed.

However, a position of the main spacer MCS should not be limited to the blue color pixel B. If the thickness of the blue color pixel B is equal to that of the green and red color pixels G and R, the main spacer MCS may be formed in any areas in which the green, blue and red color pixels G, B and R are disposed.

As shown in FIG. 3, the main spacer MCS is provided at one per three pixels. An area ratio of the main spacer MCS to a display area of the liquid crystal display 500 is about 1% or less. The area ratio indicates a ratio of an area occupied by the main spacer MCS to the display area DA (shown in FIGS. 9A to 9C) of the liquid crystal display 500.

First, second, and third sub-spacers SCS1, SCS2, and SCS3 are disposed in the first, second, and third light blocking areas BA1, BA2, and BA3, respectively. The first to third sub-spacers SCS1 to SCS3 are arranged in the first direction D1 (shown in FIG. 1) and spaced apart from each other at regular intervals. The shielding electrode SHE is disposed between adjacent sub-spacers, for example, between the first and second sub-spacers SCS1 and SCS2 and between the second and third sub-spacers SCS2 and SCS3. The shielding electrode SHE extends in a second direction D2 substantially perpendicular to the first direction D1 along the first and second data lines DL1 and DL2.

Figure 4A:
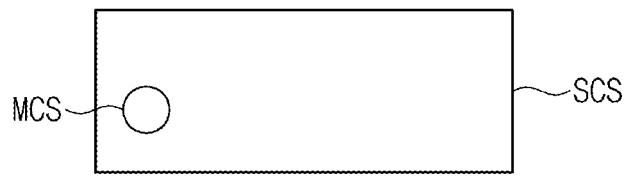
FIGS. 4A to 4C are plan views showing various shapes of main and sub-spacers.
Figure 4B:
Figure 4C:
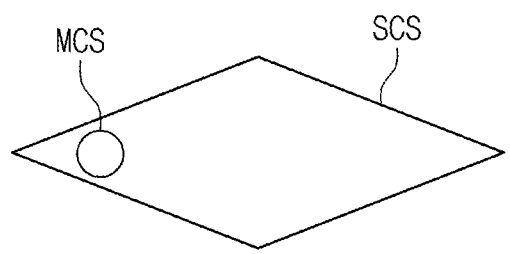

FIGS. 4A to 4C are plan views showing various shapes of the main and sub-spacers.

Referring to FIGS. 4A to 4C, the sub-spacer SCS has a rectangular shape, an oval shape, or a lozenge shape when viewed in a plan view. Since the sub-spacer SCS is formed corresponding to the light blocking area BA of the display substrate 100, the shape of the sub-spacer SCS is varied depending on the shape of the light blocking area BA.

As shown in FIGS. 4A to 4C, the main spacer MCS has a circular shape when viewed in a plan view, but the shape of the main spacer MCS should not be limited to the circular shape.

Figure 5A:
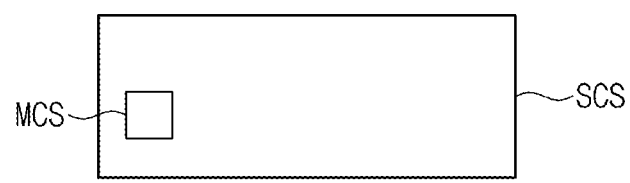
FIG. 5A to 5C are plan views showing various shapes of main and sub-spacers.
Figure 5B:
Figure 5C:
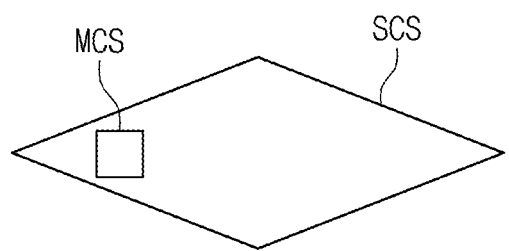

FIG. 5A to 5C are plan views showing various shapes of the main and sub-spacers.

As shown in FIGS. 5A to 5C, the main spacer MCS may have a rectangular shape when viewed in a plan view, but the shape of the main spacer MCS should not be limited to the rectangular shape.

Figure 6:
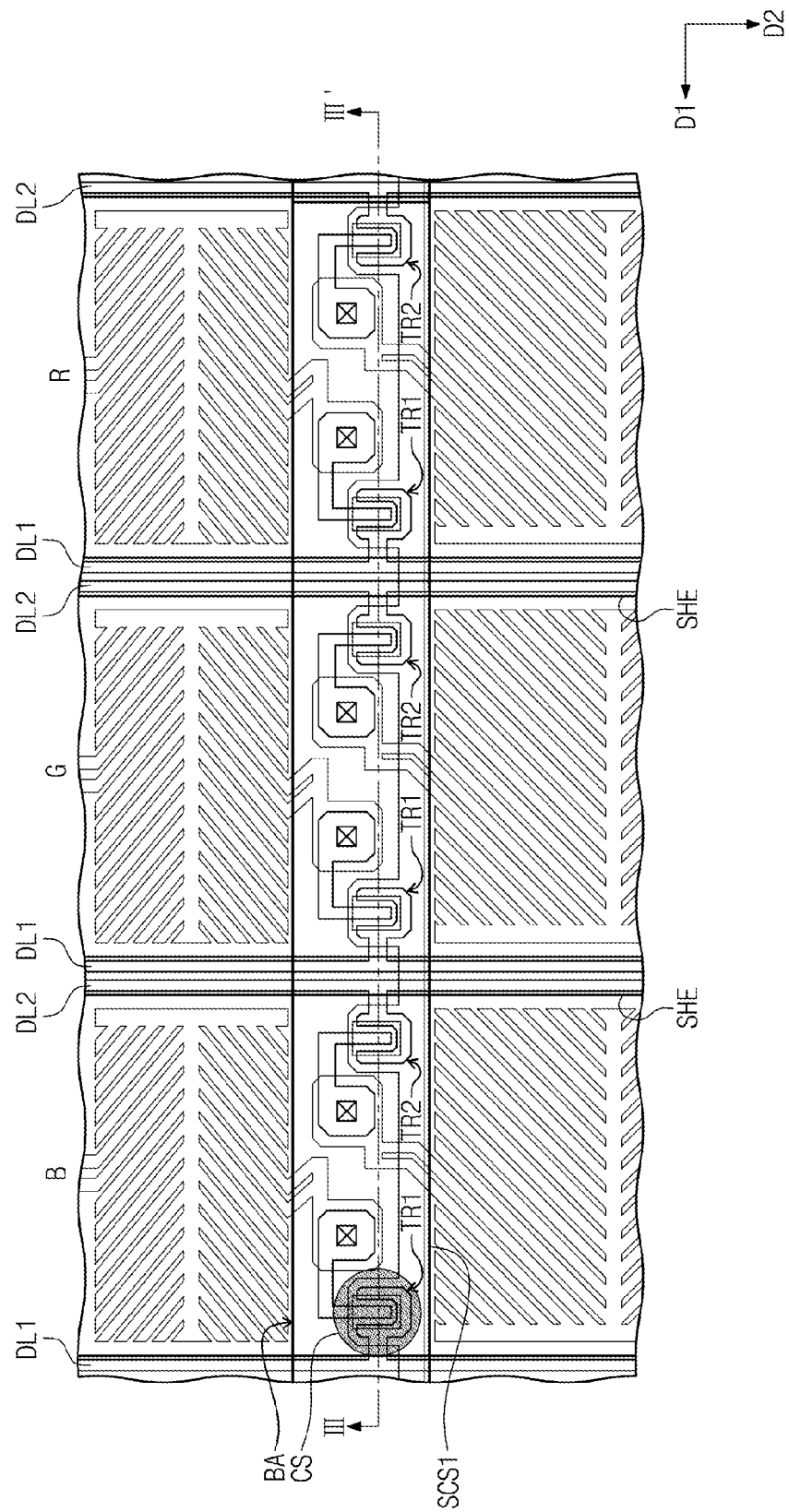
FIG. 6 is a plan view showing a position relation between a color pixel, a spacer, and a light blocking layer according to another exemplary embodiment of the present disclosure.
Figure 7:
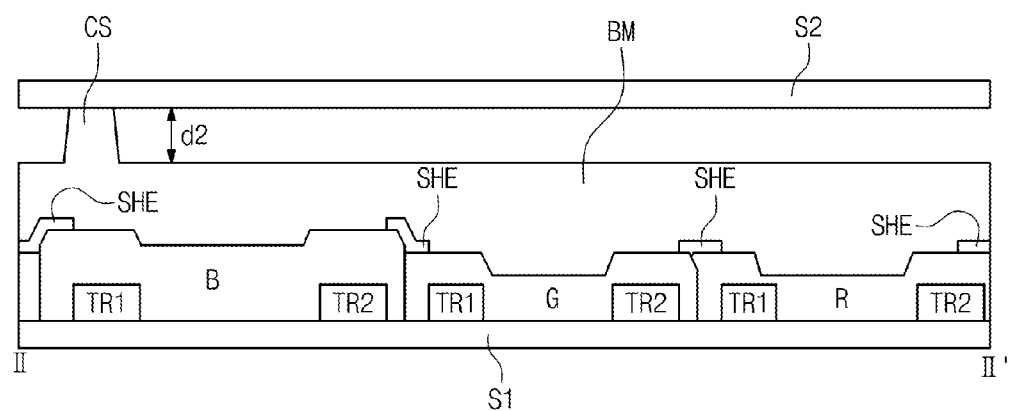
FIG. 7 is a cross-sectional view taken along a line shown in FIG. 6.

FIG. 6 is a plan view showing a position relation between a color pixel, a spacer, and a light blocking layer according to another exemplary embodiment of the present disclosure and FIG. 7 is a cross-sectional view taken along a line III-III' shown in FIG. 6. FIGS. 6 and 7 show pixels arranged in one row by three columns, and the light blocking area BA in which the first and second thin film transistors TR1 and TR2 are disposed is mainly shown in each pixel.

In FIG. 7, for the convenience of explanation, layers disposed between the first base substrate S1 and the color pixel are omitted and layers disposed on the second base substrate S2 of the opposite substrate 300 are omitted.

Referring to FIGS. 6 and 7, blue, green, and red color pixels B, G, and R are sequentially arranged in the pixels arranged in one row by three columns along the row direction. Although not shown in figures, the color pixels having the same color are arranged in the same column.

The shielding electrode SHE is disposed on the color filters B, G, and R. The shielding electrode SHE extends in the second direction D2 along the first and second data lines DL1 and DL2 to cover the areas in which the first and second data lines DL1 and DL2 are formed.

The display substrate 100 includes a light blocking layer BM and a spacer CS, which are formed of an organic material including a light blocking material, e.g., a carbon black. The light blocking layer BM extends in the first direction D1 along the gate line GL to cross the shielding electrode SHE.

The spacer CS is protruded from the light blocking layer BM to maintain a cell gap between the display substrate 100 and the opposite substrate 300. The spacer CS makes contact with the opposite substrate 300 and the light blocking layer BM is disposed to be spaced apart from the opposite substrate 300 by a predetermined distance. A difference d2 in height between the spacer CS and the light blocking layer BM is about 0.25 micrometers to about 0.8 micrometers.

As described above, when the cell gap of the liquid crystal display 500 is about 3 micrometers, the light blocking layer BM has a thickness of about 2.5 micrometers in order to maintain the height difference d2 between the light blocking layer BM and the spacer CS. That is, when the height difference d2 between the light blocking layer BM and the spacer CS is maintained in the range of about 0.25 micrometers to about 0.8 micrometers, a light leakage phenomenon of the liquid crystal display 500 may be prevented. The thickness ratio of the light blocking layer BM to the spacer CS may be from about 70% to about 95%.

The spacer CS is disposed in the light blocking area in which the blue color pixel B is arranged and not disposed in the light blocking areas in which the other color pixels are arranged. As shown in FIG. 7, the blue color filter B has a thickness thicker than that of the green and red color filters G and R. In this case, a difference in thickness between the blue color filter B and the green and red color filters G and R is about 0.2 micrometers.

As shown in FIG. 6, the spacer CS is provided at one per three pixels. An area ratio of the spacer CS to the display area of the liquid crystal display 500 is about 1% or less. The area ratio indicates a ratio of an area occupied by the spacer CS to the display area DA (shown in FIGS. 9A to 9C) of the liquid crystal display 500.

The light blocking layer BM has substantially the same thickness except a portion of the spacer CS. The spacer CS and the light blocking layer BM are formed of a same material and are formed in one piece. The spacer CS and the light blocking layer BM may be formed through a same process, for example, the same exposure step and the same development step. The spacer CS may be connected to the light blocking layer BM at the bottom of the spacer CS. Cross sectional areas of the spacer CS decrease as distance from the light blocking layer BM increases.

Figure 8:
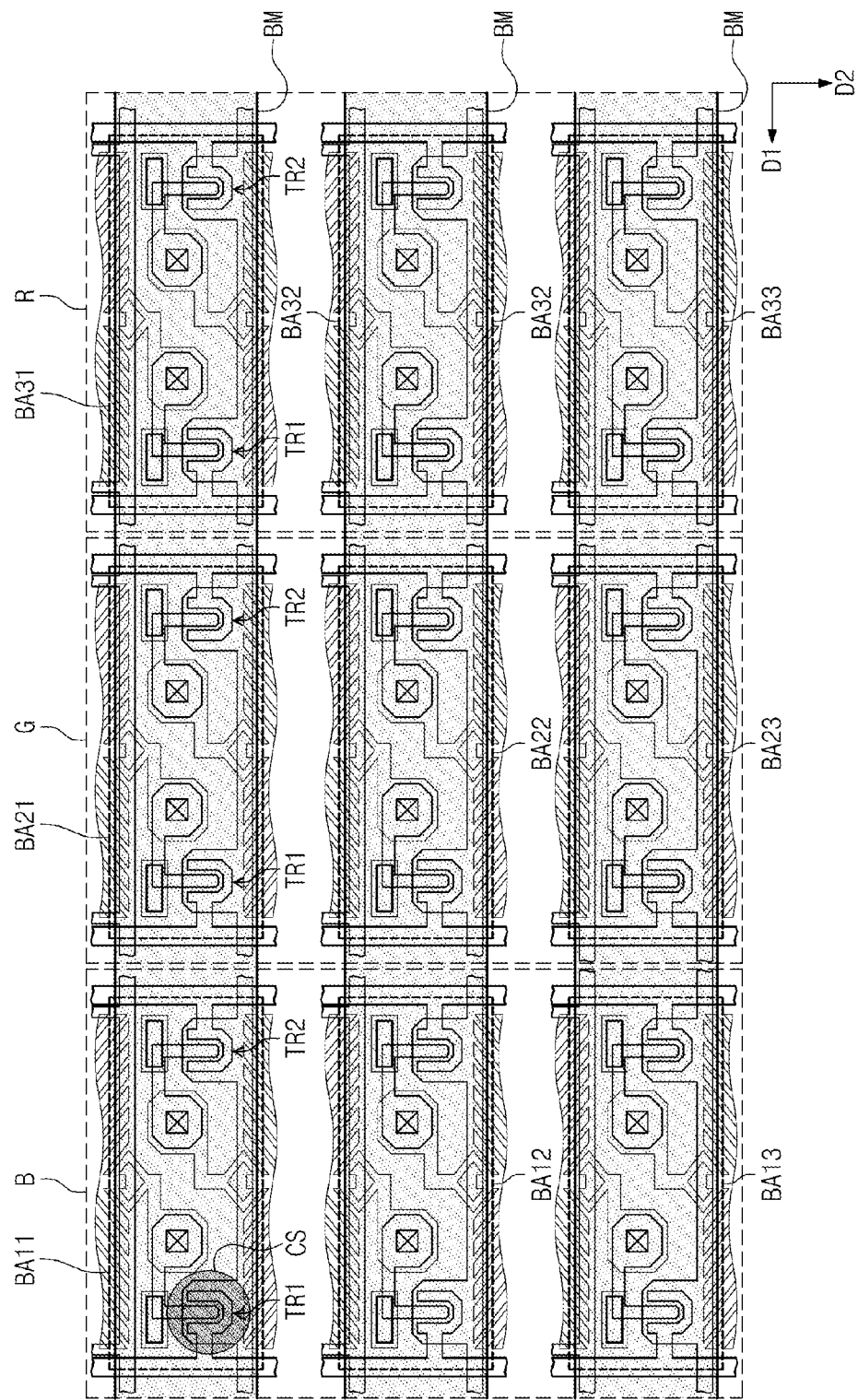
FIG. 8 is a plan view showing a position relation between a color pixel, a spacer, and a light blocking layer according to another exemplary embodiment of the present disclosure.

FIG. 8 is a plan view showing a position relation between a color pixel, a spacer, and a light blocking layer according to another exemplary embodiment of the present disclosure. In FIG. 8, the same reference numerals denote the same elements in FIG. 6, and thus detailed descriptions of the same elements will be omitted. FIG. 8 shows pixels arranged in three rows by three columns, and light blocking areas BA11, BA12, BA13, BA21, BA22, BA23, BA31, BA32, and BA33. The first and second thin film transistors TR1 and TR2 are disposed in each of the light blocking areas BA11, BA12, BA13, BA21, BA22, BA23, BA31, BA32, and BA33. Accordingly, the light blocking areas BA11, BA12, BA13, BA21, BA22, BA23, BA31, BA32, and BA33 arranged in three rows by three columns.

Referring to FIG. 8, blue, green, and red color pixels B, G, and R are sequentially arranged in the pixels arranged in three rows by three columns along the row direction and the color pixels having the same color are arranged in the same column. In detail, the blue color pixel B is disposed in each of the light blocking areas BA11, BA12, and BA13, the green color pixel G is disposed in each of the light blocking areas BA21, BA22, and BA23, and the red color pixel R is disposed in each of the light blocking areas BA31, BA32, and BA33.

In addition, the first and second thin film transistors TR1 and TR2 are arranged in each of the light blocking areas BA11 to BA33. However, the number of the thin film transistors arranged in each of the light blocking areas BA11 to BA33 may be changed by the application method of the data signals having different levels to the first and second sub-pixel electrodes PE1 and PE2. That is, one or three or more thin film transistors may be arranged in each of the light blocking areas BA11 to BA33.

The display substrate 100 includes a light blocking layer BM and a spacer CS, which are formed of an organic material including a light blocking material, e.g., a carbon black. The light blocking layer BM extends in the first direction D1 along the gate line GL.

The spacer CS is protruded from the light blocking layer BM to maintain a cell gap between the display substrate 100 and the opposite substrate 300. The spacer CS makes contact with the opposite substrate 300 and the light blocking layer BM is disposed to be spaced apart from the opposite substrate 300 by a predetermined distance. A difference d2 in height between the spacer CS and the light blocking layer BM is about 0.25 micrometers to about 0.8 micrometers. The thickness ratio of the light blocking layer BM to the spacer CS may be from about 70% to about 95%.

In the present exemplary embodiment, the spacer CS may be disposed on the first thin film transistor TR1 of one light blocking area BA11 among three light blocking areas BA11, BA12, and BA13 which are consecutively arranged in the column direction and include the blue color pixel B. That is, the number of the spacers CS disposed on the pixels arranged in three rows by three columns may be one.

In addition, an area ratio of the spacer CS to the display area DA of the liquid crystal display 500 is about 1% or less. The area ratio indicates a ratio of an area of the spacer CS to the display area DA (shown in FIGS. 9A to 9C) of the liquid crystal display 500.

The light blocking layer BM has substantially the same thickness except a portion of the spacer CS. The spacer CS and the light blocking layer BM are formed of a same material and are formed in one piece. The spacer CS and the light blocking layer BM may be formed through a same process, for example, the same exposure step and the same development step. The spacer CS may be connected to the light blocking layer BM at the bottom of the spacer CS. Cross sectional areas of the spacer CS decrease as distance from the light blocking layer BM increases.

Figure 9A:
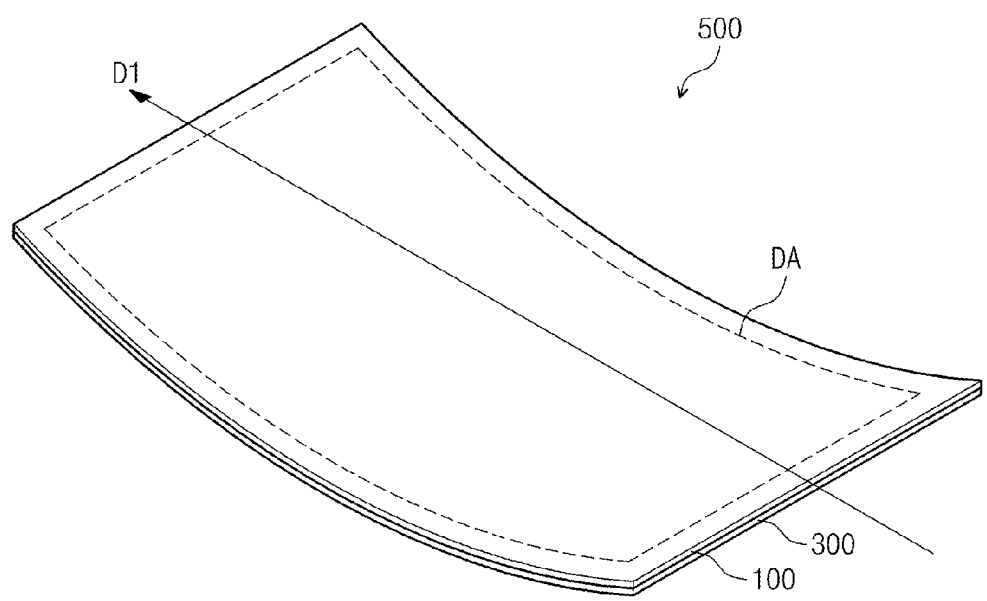
FIG. 9A is a perspective view showing a liquid crystal display according to an exemplary embodiment of the present disclosure.
Figure 9B:
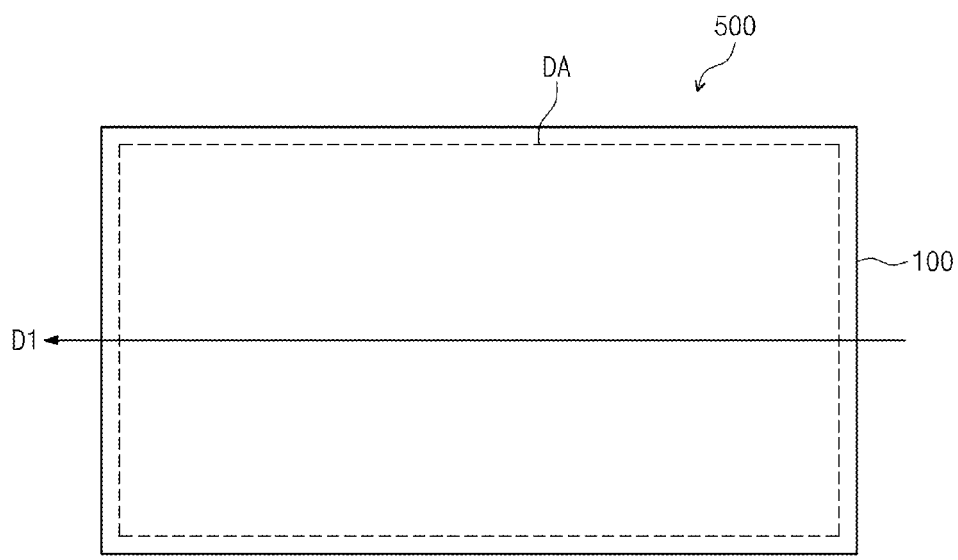
FIG. 9B is a plan view showing the liquid crystal display shown in FIG. 9A.
Figure 9C:
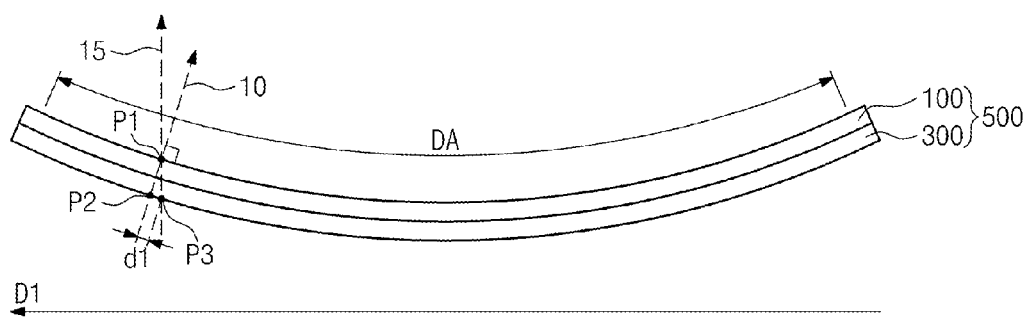
FIG. 9C is a side view showing the liquid crystal display shown in FIG. 9A.

FIG. 9A is a perspective view showing a liquid crystal display according to an exemplary embodiment of the present disclosure, FIG. 9B is a plan view showing the liquid crystal display shown in FIG. 9A, and FIG. 9C is a side view showing the liquid crystal display shown in FIG. 9A.

Referring to FIGS. 9A, 9B, and 9C, the liquid crystal display 500 includes the display area DA in which the image is displayed and has a curved shape. Accordingly, the liquid crystal display 500 may display the image having improved three-dimensional effect, a sense of immersion and a sense of reality and presence using the display area DA having the curved shape.

In the present exemplary embodiment, the liquid crystal display 500 includes the display substrate 100, the opposite substrate 300, and the liquid crystal layer. The opposite substrate 300 faces the display substrate 100 while being coupled to the display substrate 100, and the liquid crystal layer is interposed between the display substrate 100 and the opposite substrate 300.

The liquid crystal display 500 may further include other components in addition to the display substrate 100 and the opposite substrate 300.

The liquid crystal display 500 is curved along the first direction D1 in a plane surface. Accordingly, a portion or all of the display substrate 100 has the curved shape along the first direction D1 and the display area DA has the curved shape along the first direction D1. In addition, the opposite substrate 300 has the curved shape corresponding to that of the display substrate 100.

As shown in FIG. 9C, when a first point P1 is defined at a curved portion of the display substrate 100 on the side surface of the display substrate 100, a normal line 10 crossing the first point P1 crosses a second point P2 of the opposite substrate 300. In addition, a gaze line 15, which is substantially parallel to a user's view direction, is defined at the first point P1 and the gaze line 15 crosses a third point P3 of the opposite substrate 300. In this case, since the display substrate 100 and the opposite substrate 300 have the curved shape, the second point P2 may be different from the third point P3 on the opposite substrate 300.

A distance d1 between the second point P2 and the third point P3 is varied depending on a curvature of the liquid crystal display 500. As the curvature of the liquid crystal display 500 is increased, the distance d1 between the second point P2 and the third point P3 becomes increased.

As described above, the distance d1 is called as a mis-alignment between the display substrate 100 and the opposite substrate 300 due to the curvature. Hereinafter, a structure of the liquid crystal display 500, which prevents a display quality of the image displayed in the display area DA of the liquid crystal display from being deteriorated due to the mis-alignment, will be described.

Figure 10:
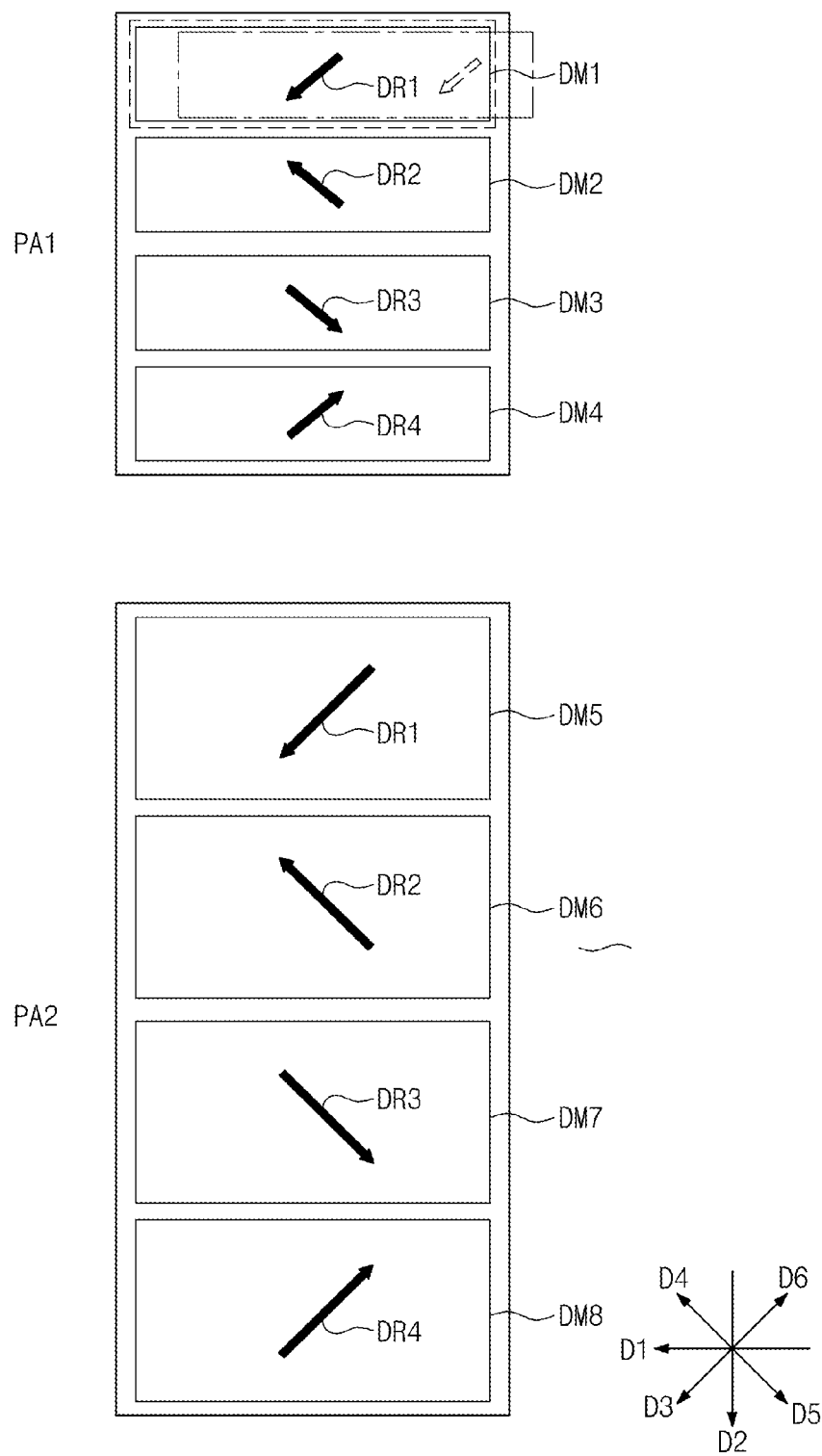
FIG. 10 is a view showing domains defined in a pixel area and directions in which liquid crystal molecules are aligned.

FIG. 10 is a view showing domains defined in a pixel area and directions in which liquid crystal molecules are aligned.

Referring to FIGS. 1 and 10, the first sub-pixel electrode PE1 includes a first horizontal trunk portion HS1, a second horizontal trunk portion HS2, a first vertical trunk portion VS1, a second vertical trunk portion VS2, and first, second, third, and fourth branch portions B1, B2, B3, and B4.

Each of the first and second vertical trunk portions VS1 and VS2 extends in a second direction D2 crossing the first direction D1 in which the liquid crystal display 500 is curved. In other words, the second direction D2 may be substantially perpendicular to the first direction D1 when viewed in a plan view.

The first horizontal trunk portion HS1 extends in the first direction D1 and is branched from a center portion of the first vertical trunk portion VS1. Accordingly, the first vertical trunk portion VS1 is coupled to the first horizontal trunk portion HS1 and has a T shape rotated at about 90 degrees in a counter-clockwise direction.

A portion of the first branch portions B1 is branched from the first horizontal trunk portion HS1 and the other portion of the first branch portions B1 is branched from the first vertical trunk portion VS1. In addition, each of the first branch portions B1 extends in a third direction D3 inclined with respect to the first and second directions D1 and D2 when viewed in a plan view and the first branch portions B1 are arranged to be spaced apart from each other.

A portion of the second branch portions B2 is branched from the first horizontal trunk portion HS1 and the other portion of the second branch portions B2 is branched from the first vertical trunk portion VS1. In addition, each of the second branch portions B2 extends in a fourth direction D4 inclined with respect to the first and second directions D1 and D2 when viewed in a plan view and the second branch portions B2 are arranged to be spaced apart from each other.

When viewed in a plan view, the fourth direction D4 may cross the third direction D3. For instance, the third and fourth directions D3 and D4 may be substantially perpendicular to each other when viewed in a plan view, and each of the third and fourth directions D3 and D4 forms an angle of about 45 degrees with the first direction D1 or the second direction D2.

The first branch portions B1 and the second branch portion are symmetric about the first horizontal trunk portion HS1, and the first horizontal trunk portion HS1 is disposed between first and second domains DM1 and DM2.

The second horizontal trunk portion HS2 extends in the first direction D1 and is branched from a center portion of the second vertical trunk portion VS2. Accordingly, the second vertical trunk portion VS2 is coupled to the second horizontal trunk portion HS2 and has a T shape rotated at about 90 degrees in a clockwise direction.

A portion of the third branch portions B3 is branched from the second horizontal trunk portion HS2 and the other portion of the third branch portions B3 is branched from the second vertical trunk portion VS2. In addition, each of the third branch portions B3 extends in a fifth direction D5 inclined with respect to the first and second directions D1 and D2 in a plan view and the third branch portions B3 are arranged to be spaced apart from each other.

A portion of the fourth branch portions B4 is branched from the second horizontal trunk portion HS2 and the other portion of the fourth branch portions B4 is branched from the second vertical trunk portion VS2. In addition, each of the fourth branch portions B4 extends in a sixth direction D6 inclined with respect to the first and second directions D1 and D2 in a plan view and the fourth branch portions B4 are arranged to be spaced apart from each other.

When viewed in a plan view, the sixth direction D6 may cross the fifth direction D5. For instance, the fifth and sixth directions D5 and D6 may be substantially perpendicular to each other when viewed in a plan view, and each of the fifth and sixth directions D5 and D6 forms an angle of about 45 degrees with the first direction D1 or the second direction D2.

The third branch portions B3 and the fourth branch portion B4 are symmetric about the second horizontal trunk portion HS2, and the second horizontal trunk portion HS2 is disposed between third and fourth domains DM3 and DM4.

The second sub-pixel electrode PE2 may have a size different from a size of the first sub-pixel electrode PE1, but the second sub-pixel electrode PE2 may have a shape similar to a shape of the first sub-pixel electrode PE1.

The second sub-pixel electrode PE2 includes a third horizontal trunk portion HS3, a fourth horizontal trunk portion HS4, a third vertical trunk portion VS3, a fourth vertical trunk portion VS4, and fifth, sixth, seventh, and eighth branch portions B5, B6, B7, and B8.

The third horizontal trunk portion HS3 is branched from the third vertical trunk portion VS3 and extends in the first direction D1, and the fourth horizontal trunk portion HS4 is branched from the fourth vertical trunk portion VS4 and extends in the first direction D1. The third horizontal trunk portion HS3 is branched from a center portion of the third vertical trunk portion VS3 and the fourth horizontal trunk portion HS4 is branched from a center portion of the fourth vertical trunk portion VS4.

A portion of the fifth branch portions B5 is branched from the third horizontal trunk portion HS3 and the other portion of the fifth branch portions B5 is branched from the third vertical trunk portion VS3. Each of the fifth branch portions B5 extends in the third direction D3 in a plan view and the fifth branch portions B5 are arranged to be spaced apart from each other.

A portion of the sixth branch portions B6 is branched from the third horizontal trunk portion HS3 and the other portion of the sixth branch portions B6 is branched from the third vertical trunk portion VS3. Each of the sixth branch portions B6 extends in the fourth direction D4 in a plan view and the sixth branch portions B6 are arranged to be spaced apart from each other.

A portion of the seventh branch portions B7 is branched from the fourth horizontal trunk portion HS4 and the other portion of the seventh branch portions B7 is branched from the fourth vertical trunk portion VS4. Each of the seventh branch portions B7 extends in the fifth direction D5 in a plan view and the seventh branch portions B7 are arranged to be spaced apart from each other.

A portion of the eighth branch portions B8 is branched from the fourth horizontal trunk portion HS4 and the other portion of the eighth branch portions B8 is branched from the fourth vertical trunk portion VS4. Each of the eighth branch portions B8 extends in the sixth direction D6 in a plan view and the eighth branch portions B8 are arranged to be spaced apart from each other.

As shown in FIG. 10, first to fourth domains DM1 to DM4 are defined in the first sub-pixel area PA1 and fifth to eighth domains DM5 to DM8 are defined in the second sub-pixel area PA2.

When the first to eighth domains DM1 to DM8 are defined in the first and second sub-pixel areas PA1 and PA2, the first sub-pixel electrode PE1 further includes a first domain connection part LP1 and the second sub-pixel electrode PE2 further includes a second domain connection part LP2.

The first domain connection part LP1 is disposed between the second domain DM2 and the third domain DM3 to connect the second and third branch portions B2 and B3 and the second domain connection part LP2 is disposed between the sixth domain DM6 and the seventh domain DM7 to connect the sixth and seventh branch portions B6 and B7. The first domain connection part LP1 is disposed at a center of a boundary area between the second and third domains DM2 and DM3 and the second domain connection part LP2 is disposed at a center of a boundary area between the sixth and seventh domains DM6 and DM7.

When the area in which the liquid crystal molecules are aligned by the first branch portions B1 is referred to as the first domain DM1, a first liquid crystal alignment direction DR1 in the first domain DM1 is defined as the third direction D3. When the area in which the liquid crystal molecules are aligned by the second branch portions B2 is referred to as the second domain DM2, a second liquid crystal alignment direction DR2 in the second domain DM2 is defined as the fourth direction D4.

A third liquid crystal alignment direction DR3 in the third domain DM3 is defined as the fifth direction D5 and a fourth liquid crystal alignment direction DR4 in the fourth domain DM4 is defined as the sixth direction D6.

According to the above description, the first to fourth domains DM1 to DM4 sequentially arranged in the second direction D2 are formed in the first sub-pixel area PA1, and the liquid crystal alignment directions are different from each other in the first to fourth domains DM1 to DM4. Accordingly, a viewing range against the first sub-pixel area PA1 may be expanded.

In addition, the fifth to eighth domains DM5 to DM8 sequentially arranged in the second direction D2 are formed in the second sub-pixel area PA2, and the liquid crystal alignment directions are different from each other in the fifth to eighth domains DM5 to DM8. Accordingly, a viewing range against the second sub-pixel area PA2 may be expanded.

The first to eighth domains DM1 to DM8 are arranged in one pixel along the second direction D2. Therefore, the domains having different liquid crystal alignment directions may be prevented from being overlapped with each other, which is caused by the mis-alignment in the liquid crystal display 500 curved in the first direction D1. As a result, a defect in texture, which is caused by the liquid crystal mis-alignment, may be prevented.

As described above, when the shielding electrode SHE, the spacer CS, and the light blocking layer BM are disposed on the display substrate 100, the light blocking area BA may be prevented from moving to the pixel area PA even though the mis-alignment occurs between the display substrate 100 and the opposite substrate 300. Thus, a vertical dark line may be prevented from occurring in the pixel area PA in a direction, i.e., the second direction D2, substantially vertical to the first direction D1 in which the liquid crystal display 500 is curved.

FIG. 11 is a flowchart showing a manufacturing process of a liquid crystal display according to an exemplary embodiment of the present disclosure.

Referring to FIG. 11, the display substrate 100 is manufactured by the forming step 1 (S11) to the forming step 9 (S19) and the opposite substrate 300 is manufactured by the forming step 1 (S21).

To manufacture the display substrate 100, the gate line GL and the first and second gate electrodes GE1 and GE2 are formed on the first base substrate S1 (S11).

The first insulating layer L1 is formed on the first base substrate S1 to cover the first gate line GL and the first and second gate electrodes GE1 and GE2, and the first and second active patterns AP1 and AP2 are formed on the first insulating layer L1 (S12). The first and second active patterns AP1 and AP2 are formed at positions to respectively face the first and second gate electrodes GE1 and GE2.

The first and second data lines DL1 and DL2 are formed on the first insulating layer L1, the first source electrode SE1 and the first drain electrode DE1 are formed on the first active pattern AP1, and the second source electrode SE2 and the second drain electrode DE2 are formed on the second active pattern AP2 (S13). Accordingly, the first and second thin film transistors TR1 and TR2 are formed on the display substrate 100.

The second insulating layer L2 is formed on the display substrate 100 to cover the first and second thin film transistors TR1 and TR2 (S14). The third insulating layer L3 is formed on the second insulating layer L2 (S15). The third insulating layer L3 may include the red, green, and blue color pixels R, G, and B.

The shielding electrode SHE is formed on the third insulating layer L3 (S16). The shielding electrode SHE is covered by the fourth insulating layer L4 (S17). The pixel electrode PE is formed on the fourth insulating layer L4 (S18). The pixel electrode PE may include the first and second sub-pixel electrodes PE1 and PE2.

The spacer CS and the light blocking layer BM are formed on the pixel electrode PE (S19). The spacer CS and the light blocking layer BM may be substantially simultaneously formed through the same process.

Although not shown in figures, a process of forming the first alignment layer may be further performed after the forming process of the spacer CS and the light blocking layer BM. The first alignment layer may be formed on the spacer and the light blocking layer BM.

To manufacture the opposite substrate 300, the common electrode CE is formed on the second base substrate S2 (S21). Although not shown in figures, a second alignment layer may be formed on the common electrode CE.

After the display substrate 100 and the opposite substrate 300 are manufactured, the liquid crystal layer LC is formed on the display substrate 100 (S31). Then, the display substrate 100 and the opposite substrate 300 are assembled to each other to complete the liquid crystal display 500 (S32).

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display comprising:
    a display substrate that includes a plurality of pixel areas each including a light blocking area in which at least one thin film transistor is disposed;
    an opposite substrate that faces the display substrate while being coupled to the display substrate;
    a liquid crystal layer that is disposed between the display substrate and the opposite substrate; and
    a spacer disposed on the light blocking area, the spacer comprising:
    a main spacer that includes a light blocking material and makes contact with the opposite substrate to maintain a cell gap between the display substrate and the opposite substrate; and
    a sub-spacer that includes the light blocking material, and is spaced apart from the opposite substrate by a predetermined distance,
    wherein the display substrate and the opposite substrate are curved along a first direction, and
    wherein the sub-spacer extends along a second direction substantially perpendicular to the first direction on the plurality of pixel areas and has substantially the same height except a portion of the spacer.

2. The liquid crystal display of claim 1, wherein a difference in height between the main spacer and the sub-spacer is from about 0.25 micrometers to about 0.8 micrometers.

3. The liquid crystal display of claim 2, wherein the difference in height between the main spacer and the sub-spacer is from about 0.5 micrometers to about 0.8 micrometers.

4. The liquid crystal display of claim 2, wherein an area ratio of a main spacer area to the display area in which an image is displayed is about 1% or less.

5. The liquid crystal display of claim 1, wherein the main spacer is disposed at a position corresponding to an area in which the thin film transistor is disposed.

6. The liquid crystal display of claim 1, wherein the main spacer is provided at one per every three or nine pixels.

7. The liquid crystal display of claim 6, wherein the display substrate comprises red, green, and blue color pixels and the main spacer is disposed on the blue color pixel.

8. The liquid crystal display of claim 1, wherein the pixel area comprises a first sub-pixel area having a first sub-pixel electrode and a second sub-pixel area having a second sub-pixel electrode, and the thin film transistor comprises a first thin film transistor connected to the first sub-pixel electrode and a second thin film transistor connected to the second sub-pixel electrode.

9. The liquid crystal display of claim 8, wherein the display substrate further comprises:
    a first data line electrically connected to the first sub-pixel electrode to apply a first data signal to the first sub-pixel electrode;
    a second data line electrically connected to the second sub-pixel electrode to apply a second data signal different from the first data signal to the second sub-pixel electrode; and
    a shielding electrode extending along the first and second data lines to receive a black gray scale voltage,
    wherein the first and second data lines and the shielding electrode extend in the first direction.

10. The liquid crystal display of claim 9, wherein the light blocking area is disposed between the first and second sub-pixel areas, the sub-spacer has a rectangular shape, an oval shape, or a lozenge shape when viewed in a plan view, and the main spacer has a circular shape, a rectangular shape, or an oval shape when viewed in a plan view.

11. A liquid crystal display comprising:
    a display substrate that includes a plurality of pixel areas each including a light blocking area in which at least one thin film transistor is disposed;
    an opposite substrate that faces the display substrate while being coupled to the display substrate;
    a liquid crystal layer disposed between the display substrate and the opposite substrate;
    a spacer disposed on the display substrate, including a light blocking material, and making contact with the opposite substrate to maintain a cell gap between the display substrate and the opposite substrate; and
    a light blocking layer disposed on the display substrate, including the light blocking material and spaced apart from the opposite substrate by a predetermined distance,
    wherein the display substrate and the opposite substrate are curved along a first direction, and
    wherein the light blocking layer has substantially the same height except a portion of the spacer and extends along a second direction substantially perpendicular to the first direction on the plurality of pixels.

12. The liquid crystal display of claim 11, wherein the difference in height between the light blocking layer and the spacer is about 0.5 micrometers to about 0.8 micrometers.

13. The liquid crystal display of claim 11, wherein an area ratio of a spacer area to the display area is about 1% or less.

14. The liquid crystal display of claim 11, wherein the spacer is disposed at a position corresponding to an area in which the thin film transistor is disposed.

15. The liquid crystal display of claim 11, wherein the spacer is provided at one per every three or nine pixels.

16. The liquid crystal display of claim 15, wherein the display substrate comprises red, green, and blue color pixels and the spacer is disposed on the blue color pixel.

17. The liquid crystal display of claim 11, wherein the pixel area comprises a first sub-pixel area having a first sub-pixel electrode and a second sub-pixel area having a second sub-pixel electrode, and the thin film transistor comprises a first thin film transistor connected to the first sub-pixel electrode and a second thin film transistor connected to the second sub-pixel electrode.

18. The liquid crystal display of claim 17, wherein the display substrate further comprises:
 a first data line electrically connected to the first sub-pixel electrode to apply a first data signal to the first sub-pixel electrode;
 a second data line electrically connected to the second sub-pixel electrode to apply a second data signal different from the first data signal to the second sub-pixel electrode;
 a gate line disposed between the first and second sub-pixel areas, crossing the first and second data lines, and insulated from the first and second data liens; and
 a shielding electrode extending along the first and second data lines to receive a black gray scale voltage,
 wherein the first and second data lines and the shielding electrode extend in the first direction, and the gate line extends in the second direction.

19. The liquid crystal display of claim 18, wherein the light blocking area is disposed between the first and second sub-pixel areas, and the light blocking layer extends along the gate line to cross the shielding electrode.

20. The liquid crystal display of claim 11, wherein the spacer has a circular shape, a rectangular shape, or an oval shape when viewed in a plan view.

21. A liquid crystal display comprising:
 a display substrate that includes a plurality of pixels, each of the plurality of pixels including a pixel area and a light blocking area, the light blocking area including at least one thin film transistor;
 an opposite substrate that faces the display substrate while being coupled to the display substrate;
 a liquid crystal layer that is disposed between the display substrate and the opposite substrate; and
 a spacer disposed on the light blocking area, the spacer comprising:
  a main spacer that includes a light blocking material and makes contact with the opposite substrate to maintain a cell gap between the display substrate and the opposite substrate; and
  a sub-spacer that includes the light blocking material and is spaced apart from the opposite substrate by a predetermined distance,
 wherein the display substrate and the opposite substrate are curved along a first direction, and the sub-spacer extends along a second direction substantially perpendicular to the first direction on the plurality of pixels, and
 wherein the sub-spacer has substantially the same height except a portion of the main spacer.

22. The liquid crystal display of claim 21, wherein a height ratio of the sub-spacer to the main spacer is from about 70% to about 95%.

23. The liquid crystal display of claim 22, wherein the spacer is formed on the display substrate over the thin film transistor and cross sectional area of the main spacer decreases as distance from the thin film transistor increases.

24. The liquid crystal display of claim 23, wherein a difference in height between the main spacer and the sub-spacer is from about 0.25 micrometers to about 0.8 micrometers.

25. The liquid crystal display of claim 23, wherein a difference in height between the main spacer and the sub-spacer is from about 0.25 micrometers to about 0.8 micrometers.

26. The liquid crystal display of claim 22, wherein the spacer is formed on the display substrate over the thin film transistor and cross sectional area of the main spacer decreases as distance from the thin film transistor increases.

27. The liquid crystal display of claim 23, wherein a difference in height between the main spacer and the sub-spacer is from about 0.25 micrometers to about 0.8 micrometers.

28. The liquid crystal display of claim 23, wherein a difference in height between the main spacer and the sub-spacer is from about 0.25 micrometers to about 0.8 micrometers.

* * * * *